(No Model.)

C. W. WARING.
TRACTION WHEEL.

No. 345,342. Patented July 13, 1886.

Witnesses:
B. C. Fenwick
M. B. Voute

Inventor:
Chas. W. Waring
by John S. Duffie
His Attorney

UNITED STATES PATENT OFFICE.

CHARLES W. WARING, OF WRIGHTSVILLE, ARKANSAS.

TRACTION-WHEEL.

SPECIFICATION forming part of Letters Patent No. 345,342, dated July 13, 1886.

Application filed April 24, 1886. Serial No. 200,040. (No model.)

*To all whom it may concern:*

Be it known that I, CHARLES W. WARING, a citizen of the United States, residing at Wrightsville, in the county of Pulaski and State of Arkansas, have invented certain new and useful Improvements in Traction-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in mower and reaper wheels, the main feature being a perforated tire or rim, through which pins are made to alternately project and withdraw, as shown in the accompanying drawings and claims hereinafter set forth.

Figure 1:
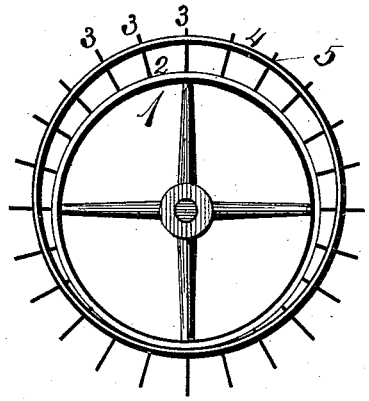
Figure 6:
Figure 2:
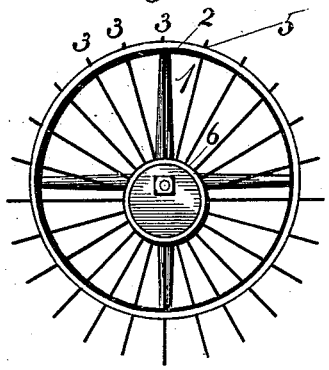
Figure 7:
Figure 3:
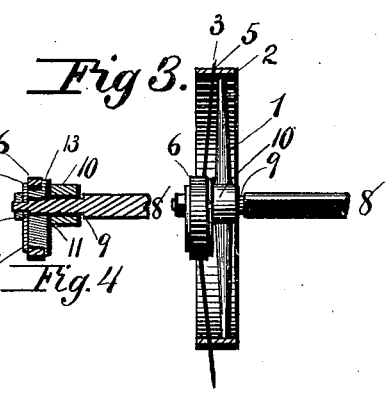
Figures 4, 5:
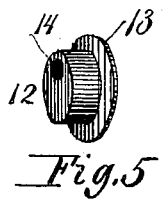

In the accompanying drawings, Figure 1 is a side elevation of my invention. Fig. 2 is a modified form of the same. Fig. 3 is an edge view of Fig. 2, cut on line $x$ $x$. Fig. 6 is a face view of a section of the rim 4, in which is shown the elongated slots; and Fig. 7 is a face view of a section of the rim 2, showing the elongated slots. Figs. 4 and 5 are detail views.

In low and marshy grounds the wheels of mowers and reapers, which run upon the ground and also operate the machiney, frequently slide upon the surface, and as a consequence the machinery intended to be operated thereby stands still; and when pins are projected from the rim of the wheels the spaces between them are soon filled up with mud, &c., and the wheels slide, as before. To remedy this evil in a simple, cheap, and easy manner is the object of my invention.

I make a mower or reaper wheel, 1, and from the center of its periphery 2 I project a number of pins, 3, about four inches long; then make an extra rim, 4, about four inches more across its diameter than is the diameter of the said wheel 1. The perforations 5 in the said rim 4 are elongated, as shown in Fig. 6, the slot running with the rim and not across it, so that the said rim can be pressed up against the periphery of the rim 2 of the wheel 1.

When the weight of the wheel 1 presses down, the rim is pressed up against its periphery, and the pins 3, then on the lower part of the said rim, project through the perforations or slots 5 in the extra rim 4, and enter the ground and keep the said wheel 1 from slipping, while the same cause presses the said extra rim up from the upper part of the periphery of said rim 2, and withdraws the said pins 3, then on the upper side of said rim, and thus cleans the mud from them. Thus as the pins 3 come around to the bottom they are successively pressed through the perforations in the rim into the ground, and as they come round to the top they are successively withdrawn through said perforations, and thereby cleaned.

The operation of the wheel shown in Fig. 2 is the same, except the perforations are in the center of the rim 2 of the wheel 1, as shown in Fig. 7, and not in the extra rim, and the pins 3 are projected from a hub, 6, which works on an eccentric, 7. The center of said hub 6 being about four inches lower than the center of wheel 1 the effect is obvious. The axle 8 has on its ends a spindle, 9, for the hub 10 of the main wheel 1 to turn on. This spindle is squared immediately at the point where it passes through the hub. On this square 11 is fitted an eccentric, 12, having on its rear end a flange, 13. A square hole, 14, passes through this eccentric near its upper edge, and it is put on the square with its long side down. The hub 6 fits and revolves on this eccentric 12. The flange 13 acts as a nut to keep hub of wheel 1 in place, and for the rear end of hub 6 to work against. On the outer end of this square 11 is put an eccentric washer, 15, fitting against the outer end of the hub 6. This square 11 terminates in a threaded end on which is fitted a nut, 16.

Having thus described my invention, what I claim as new, and desire to secure by Letters Patent, is—

1. The combination of wheel 1, pins 3, projecting from the periphery of said wheel and passing through the elongated perforations of extra rim 4, perforated extra rim 4, fitting loosely on said pins and around the rim of said wheel, substantially as shown and described.

2. The combination of wheel 1, having the perforations 5 through its rim, the pins 3, projecting from hub 6 through said perforations, hub 6, operating said pins, eccentric 12, fitting on the square 11 of the spindle 8, eccentric washer 15, fitting on said square and holding said hub in place, and nut 16, substantially as shown and described.

3. The combination of the axle 8, having the spindle 9, square 11, eccentric 12, fitting on said square, wheel 1, revolving on said spindle, hub 6, revolving on eccentric 12 and having pins 3 projecting from its surface through perforations 5 in the rim of said wheel 1, eccentric washer 15, fitting on the square 11 against the outer end of hub 6, and nut 16, screwing on the threaded end of the axle 8, substantially as shown and described.

In testimony whereof I affix my signature in presence of two witnesses.

CHARLES W. WARING.

Witnesses:
JAMES P. SEE,
I. K. GLENN.